United States Patent
Cox

(10) Patent No.: US 9,556,733 B2
(45) Date of Patent: *Jan. 31, 2017

(54) TUNNEL BORING MACHINE DISC CUTTERS AND RELATED METHODS OF MANUFACTURE

(71) Applicant: US Synthetic Corporation, Orem, UT (US)

(72) Inventor: Edwin Sean Cox, Spanish Fork, UT (US)

(73) Assignee: US SYNTHETIC CORPORATION, Orem, UT (US)

(*) Notice: Subject to any disclaimer, the term of this patent is extended or adjusted under 35 U.S.C. 154(b) by 236 days.

This patent is subject to a terminal disclaimer.

(21) Appl. No.: 13/790,046

(22) Filed: Mar. 8, 2013

(65) Prior Publication Data

US 2014/0252843 A1 Sep. 11, 2014

(51) Int. Cl.
*E21D 9/10* (2006.01)
*E21B 10/12* (2006.01)
(Continued)

(52) U.S. Cl.
CPC ............. *E21D 9/1006* (2013.01); *E21B 10/12* (2013.01); *E21B 10/22* (2013.01); *E21C 25/18* (2013.01);
(Continued)

(58) Field of Classification Search
CPC .......... E21D 9/104; E21D 9/10; E21D 9/1006; E21B 10/12; E21B 10/22; F16C 33/043
(Continued)

(56) References Cited

U.S. PATENT DOCUMENTS 3,791,465 A 2/1974 Metge
3,981,370 A 9/1976 Binghanm et al.
(Continued)

FOREIGN PATENT DOCUMENTS

CN 201763353 3/2011
DE 19821390 11/1999
(Continued)

OTHER PUBLICATIONS

U.S. Appl. No. 13/790,019, filed Mar. 8, 2013, Cox.
(Continued)

*Primary Examiner* — John Kreck
*Assistant Examiner* — Michael Goodwin
(74) *Attorney, Agent, or Firm* — Dorsey & Whitney LLP

(57) ABSTRACT

In an embodiment, a disc cutter for use on a tunnel boring machine may include a shaft and a cutter assembly rotatably mounted on the shaft. The cutter assembly may include a cutter ring extending circumferentially about a central axis and one or more bearing apparatuses rotatably mounting the cutter assembly to the shaft. Each bearing apparatuses may include a rotor extending circumferentially about the central axis and a first plurality of superhard bearing elements distributed circumferentially about the central axis. Each first superhard bearing element may be attached to the rotor and may include a bearing surface. The bearing apparatuses may further include a stator extending circumferentially about the central axis and a second plurality of superhard bearing elements attached to the stator that are generally opposed to the first plurality of superhard bearing elements of the rotor.

17 Claims, 11 Drawing Sheets

(51) Int. Cl.
*E21B 10/22* (2006.01)
*F16C 33/04* (2006.01)
*E21C 25/18* (2006.01)

(52) U.S. Cl.
CPC .............. *E21D 9/104* (2013.01); *F16C 33/043* (2013.01); *Y10T 29/49826* (2015.01)

(58) Field of Classification Search
USPC .... 299/106, 107, 110, 111, 113; 384/26, 95, 384/97, 129, 227, 246, 271, 302, 306, 309, 420, 384/548, 571
See application file for complete search history.

(56) References Cited

U.S. PATENT DOCUMENTS

| | | | |
|---|---|---|---|
| 4,298,080 A * | 11/1981 | Hignett | 175/373 |
| 4,339,009 A | 7/1982 | Busby | |
| 4,756,631 A | 7/1988 | Jones | |
| 4,793,427 A | 12/1988 | Lambson et al. | |
| 4,802,539 A * | 2/1989 | Hall et al. | 175/371 |
| 5,234,064 A | 8/1993 | Lenaburg | |
| 5,273,125 A | 12/1993 | Jurewicz | |
| 5,351,770 A * | 10/1994 | Cawthorne et al. | 175/374 |
| 5,598,895 A * | 2/1997 | Anderson et al. | 175/373 |
| 5,626,201 A | 5/1997 | Friant et al. | |
| 5,628,549 A * | 5/1997 | Ritchey et al. | 299/104 |
| 5,904,211 A | 5/1999 | Friant et al. | |
| 5,906,245 A | 5/1999 | Tibbitts et al. | |
| 5,961,185 A | 10/1999 | Friant et al. | |
| 6,340,245 B1 | 1/2002 | Horton et al. | |
| 6,367,569 B1 * | 4/2002 | Walk | 175/373 |
| 7,676,968 B2 | 3/2010 | Hall et al. | |
| 7,842,111 B1 | 11/2010 | Sani | |
| 7,866,418 B2 | 1/2011 | Bertagnolli et al. | |
| 7,896,551 B2 | 3/2011 | Cooley et al. | |
| 8,079,431 B1 | 12/2011 | Cooley et al. | |
| 8,236,074 B1 | 8/2012 | Bertagnolli et al. | |
| 8,277,124 B2 | 10/2012 | Sexton et al. | |
| 2001/0042644 A1 * | 11/2001 | Nishiyama et al. | 175/371 |
| 2006/0144200 A1 | 7/2006 | Duden | |
| 2008/0284236 A1 | 11/2008 | Hall et al. | |
| 2009/0058172 A1 * | 3/2009 | de Andrade et al. | 299/55 |
| 2009/0283332 A1 * | 11/2009 | Dick et al. | 175/374 |
| 2009/0322143 A1 | 12/2009 | Krauter | |
| 2011/0259150 A1 | 10/2011 | Hall et al. | |
| 2011/0259646 A1 | 10/2011 | Hall et al. | |
| 2012/0212034 A1 | 8/2012 | Shanahan et al. | |
| 2013/0044971 A1 | 2/2013 | Cooley et al. | |
| 2014/0169718 A1 * | 6/2014 | Peterson et al. | 384/569 |

FOREIGN PATENT DOCUMENTS

| | | |
|---|---|---|
| WO | WO 99/58808 | 11/1999 |
| WO | WO 2014/093662 | 6/2014 |

OTHER PUBLICATIONS

U.S. Appl. No. 13/480,932, filed May 25, 2012, Tulet, et al.
U.S. Appl. No. 13/713,096, filed Dec. 13, 2012, Peterson, et al.
"Wear Patterns and Prediction of Disc Cutter Consumption for Tunnel Boring Machines" C. Frenzel, Colorado School of Mines, SME Annual Meeting, Feb. 27, 2011-Mar. 2, 2011, pp. 1-6.
International Search Report and Written Opinion from International Application No. PCT/US2014/022049 mailed Mar. 6, 2015.
U.S. Appl. No. 13/790,019, Jul. 1, 2015, Office Action.
International Search Report and Written Opinion from International Application No. PCT/US2014/022071 mailed Mar. 6, 2015.
U.S. Appl. No. 13/790,019, Feb. 2, 2016, Notice of Allowance.

* cited by examiner

TUNNEL BORING MACHINE DISC CUTTERS AND RELATED METHODS OF MANUFACTURE

BACKGROUND

A variety of cutters or bits are presently used in mechanical excavation systems. One type of cutter commonly used on cutter heads in rock excavation is a disc-type rolling cutter. For example, hardened steel disc cutters are frequently used on cutterheads employed in tunnel boring, raise drilling, large diameter blind drilling, and/or small diameter drilling systems.

In hard rock, the disc cutter may be used to apply great thrust on the cutter, and consequently pressure on the rock to be cut, a zone of rock directly beneath (i.e., in the cutting direction) and adjacent to the disc cutter is crushed, normally forming very fine particles. The crushed zone may form a hydraulic-like pressure downward (again, in the cutting direction) and outward against the adjacent rock. The adjacent rock then cracks, and chips spall from the rock face being excavated. The crushed rock is then collected and removed as debris.

The service life of disc cutters can be a significant limitation in the operating efficiency of mechanical excavation systems using such cutters. For example, because the disc cutters are typically pushed against hard rock surfaces (i.e., tunnel faces) with very significant forces including high shock loads and work in an abrasive, high wear environment, the disc cutters can wear at a rapid rate. In addition, disc cutters typically include bearing systems that allow the disc cutters to rotate on the target surface as the cutterheads rotate. If this bearing system fails, the disc cutter can stop turning. When the disc cutter stops turning, the portion of the disc cutter in contact with the target surface slides. This sliding contact can wear the disc cutter rapidly into a flat, wide spot that no longer is able to apply adequate compressive force against the target surface to crush hard rock or other hardened material. These disc cutters may be replaced. However, to change disc cutters, mechanical excavation systems can be stopped for several hours while the disc cutters are removed, replaced, and/or repaired. This time and effort intensive repair activity reduces the overall efficiency or rate of mechanical excavation systems using the disc cutters.

Therefore, manufacturers and users of disc cutters continue to seek improved disc cutter designs and manufacturing techniques.

SUMMARY

Various embodiments of the invention relate to disc cutters and related methods of manufacture. The various embodiments of the disc cutters may be used in tunnel boring machines, raise drilling systems, large diameter blind drilling systems, and other types of mechanical systems.

In an embodiment, a disc cutter for use on a tunnel boring machine may include a shaft and a cutter assembly rotatably mounted on the shaft. The cutter assembly may include a cutter ring extending circumferentially about a central axis and one or more bearing apparatuses rotatably mounting the cutter assembly to the shaft. Each bearing apparatuses may include a rotor extending circumferentially about the central axis and a first plurality of superhard bearing elements distributed circumferentially about the central axis. Each first superhard bearing element may be attached to the rotor and may include a bearing surface. The bearing apparatuses may further include a stator extending circumferentially about the central axis and a second plurality of superhard bearing elements attached to the stator that are generally opposed to the first plurality of superhard bearing elements of the rotor.

In an embodiment, a disc cutter may include a shaft and a cutter assembly rotatably mounted on the shaft. The cutter assembly may include a cutter ring extending circumferentially about a central axis that includes a radially inner surface and a radially outer surface. The disc cutter may also include one or more roller bearing apparatuses mounting the cutter assembly to the shaft. Each bearing apparatus may include a rotor extending circumferentially about the central axis and a first plurality of superhard raceway elements distributed about the central axis. Each of the first plurality of superhard raceway elements may be attached to the rotor and may include a raceway surface positioned and configured to form a first portion of a raceway. The one or more bearing apparatuses may also include a stator extending circumferentially about the central axis and a second plurality of superhard raceway elements attached the stator. Each of the second plurality of superhard raceway elements may include a raceway surface positioned and configured to form a second portion of the raceway. The one or more roller bearing apparatuses may further include a plurality of rolling elements interposed between the rotor and the stator.

In an embodiment, a disc cutter for use on a tunnel boring machine may include a shaft and a cutter assembly rotatably mounted on the shaft. The cutter assembly may include a cutter ring having an inner surface and an outer surface including a plurality of pockets formed therein. The disc cutter may further include a plurality of superhard cutter elements distributed circumferentially about an axis. Each of the plurality of superhard cutting elements may be positioned in a corresponding one of the pockets and comprises polycrystalline diamond ("PCD"). At least a number of the superhard cutting elements may extend beyond the outer surface of the cutter ring. The disc cutter may further include one or more bearing apparatuses rotatably mounting the cutter assembly to the shaft. The one or more bearing apparatuses may include a rotor including a first plurality of superhard bearing elements distributed circumferentially about an axis. Each of the first plurality of superhard bearing elements may include a bearing surface. The one or more bearing apparatuses may further include a stator having a second plurality of superhard bearing elements generally opposed to the first plurality of superhard bearing elements of the rotor.

In an embodiment, a method of manufacturing a disc cutter for use on a tunnel boring machine may include providing a cutter assembly comprising a cutter ring having a cutting surface. The method further includes rotatably mounting the cutter assembly on a shaft via one or more bearing apparatuses. Each bearing apparatus may include a rotor extending circumferentially about the central axis and a first plurality of superhard bearing elements distributed circumferentially about the central axis. Each of the first plurality of superhard bearing elements may be attached to the rotor and may include a bearing surface. Each bearing apparatus may further include a stator extending circumferentially about the central axis and a second plurality of superhard bearing elements attached to the stator. The second plurality of superhard bearing elements may be generally opposed the first plurality of superhard bearing elements of the rotor.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention generally relate to tunnel boring machine disc cutters, and related methods of manufacture. The various embodiments of the cutter assemblies and the disc cutters may be used in tunnel boring machines ("TBMs"), raise drilling systems, large diameter blind drilling systems, and other types of systems.

Figure 1:
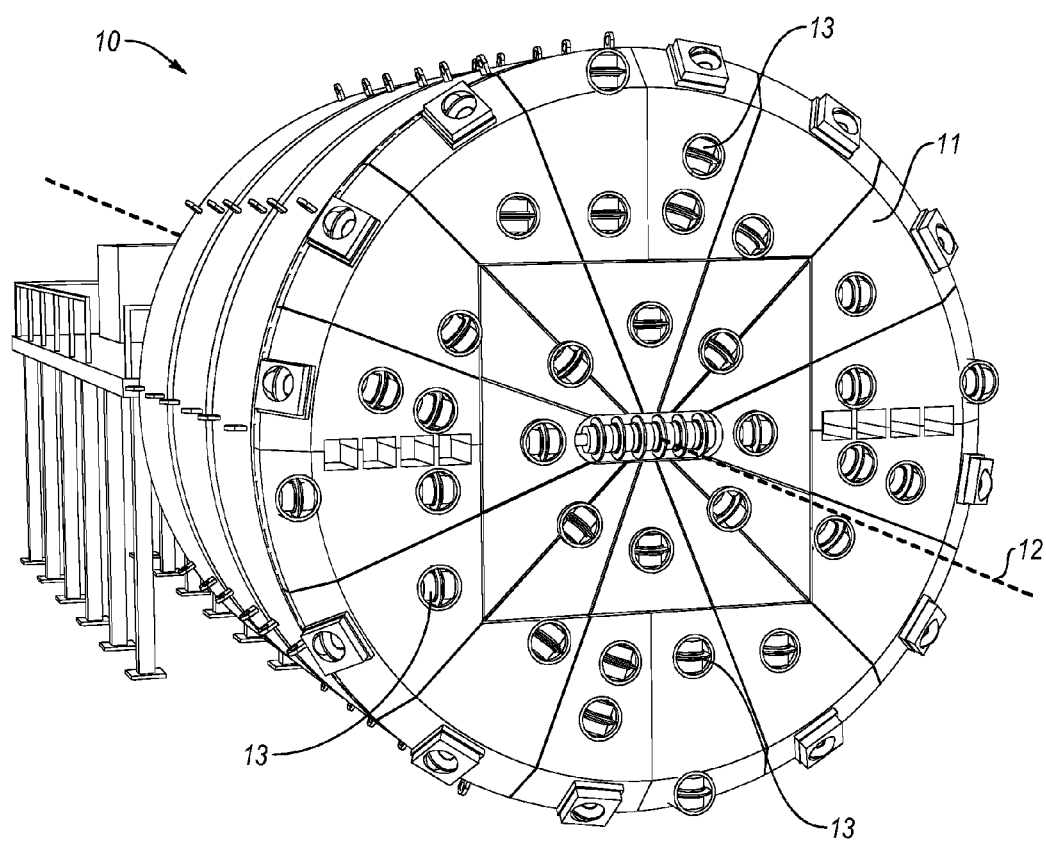
FIG. 1 is a schematic perspective view of a tunnel boring machine that may utilize any of the disclosed disc cutters according to various embodiments.

FIG. 1 is a schematic perspective view of a TBM 10 according to an embodiment. The TBM 10 may include a large rotating cutterhead or head 11 positioned at a front end of the TBM 10. The head 11 may be configured to rotate around a rotation axis 12 that is generally coaxial with the geometry of the tunnel. In an embodiment, one or more disc cutters 13 may be mounted to the rotating head 11. The disc cutters 13 may be mounted onto the head 11 in one or more patterns so that as the head 11 rotates about the rotation axis 12, the disc cutters 13 are able to contact selected portions of a target surface or tunnel face. The disc cutters 13 may comprise one or more cutter assemblies rotatably mounted via bearings onto a shaft. The shaft, in turn, is secured to the head 11 and defines another rotation axis for the disc cutter 13 that is generally orthogonal to the rotation axis 12 of head 11. As the head 11 rotates about the rotation axis 12, the cutter assembly of the disc cutter 13 rotates on the shaft.

In an embodiment, the disc cutters 13 may be configured to perform the task of excavating material (e.g., rock) from the target surface or tunnel face. For example, as the head 11 advances and rotates, the disc cutters 13 rotate and are pushed against the tunnel face, typically under power from a system of hydraulic cylinders (not shown). The disc cutters 13 fractionate, crush, loosen materials, or combinations thereof, on the tunnel face, which may be transported away by the TBM 10. As described in more detailed below, in an embodiment, the disc cutters 13 may include a cutting surface configured and positioned to contact and cut the target surface or tunnel face. As the loosened material is removed, the tunnel length increases as the TBM 10 advances to maintain engagement of the head with the tunnel face. Hydraulic cylinders may also be deployed along with means which push against the sides of the tunnel in order to counter the force of the disc cutters 13 against the tunnel face.

Figure 2:
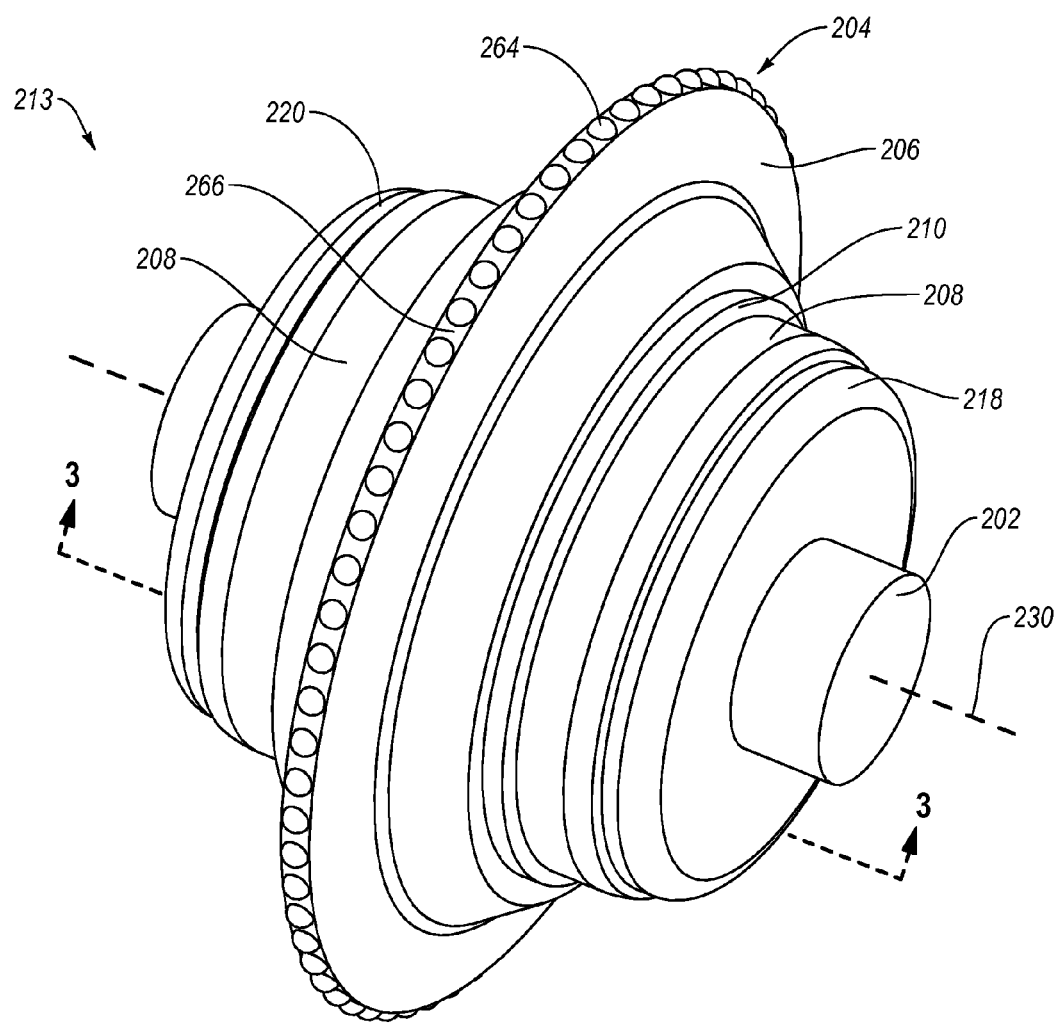
FIG. 2 is an isometric view of a disc cutter according to an embodiment.
Figure 3:
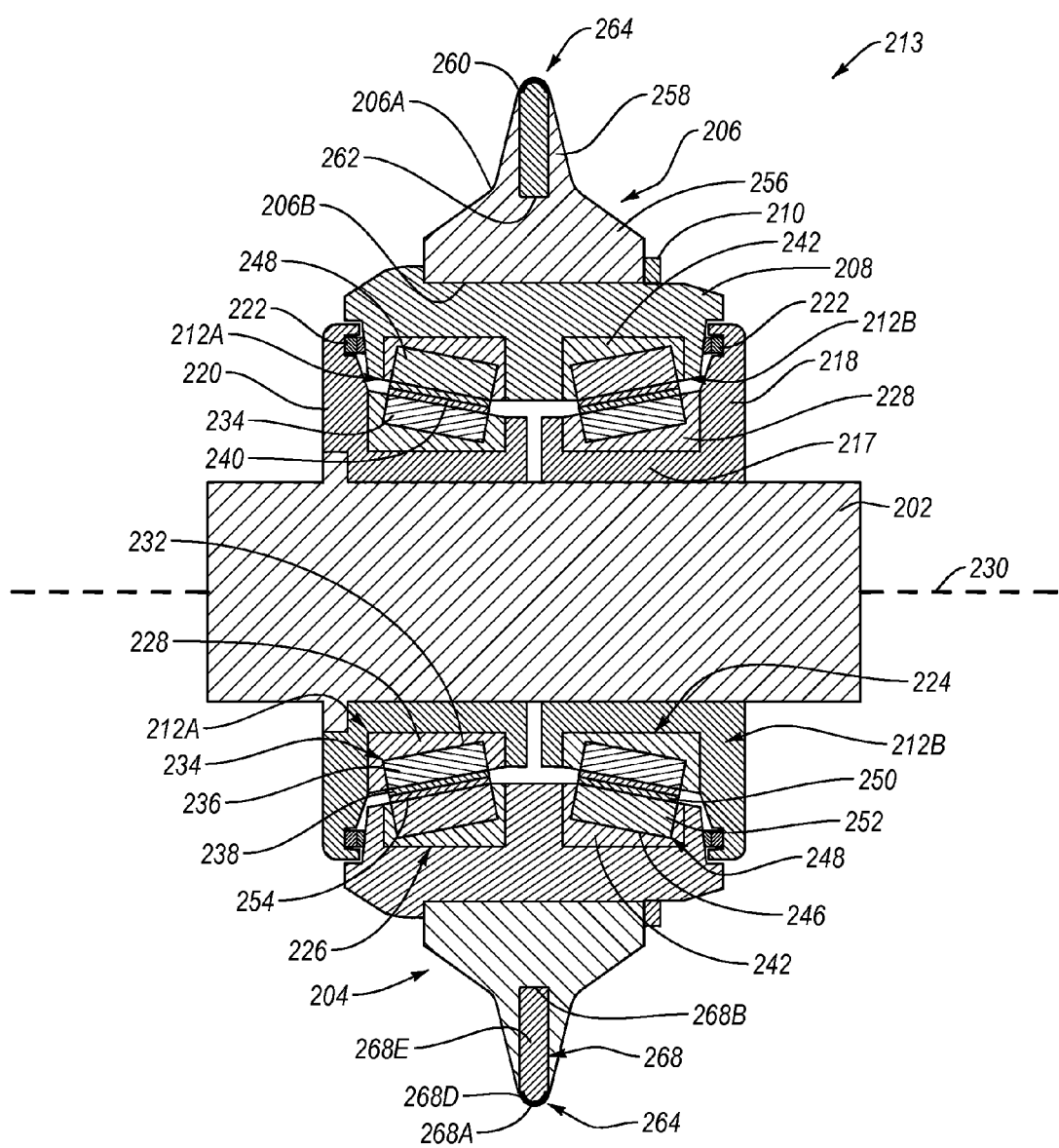
FIG. 3 is a cross-sectional view taken along line 3-3 of the disc cutter shown in FIG. 2.

FIGS. 2 and 3 are isometric and cross-sectional views of a disc cutter 213 according to an embodiment. The disc cutter 213 may include a shaft 202 configured to be fixedly attached to the head 11. The disc cutter 213 may further include a cutter assembly 204 including a cutter ring 206 extending circumferentially about a central axis 230. The cutter ring 206 may be attached to a hub 208 with a retainer member 210. In an embodiment, the cutter assembly 204 may be rotatably mounted to the shaft 202 with one or more bearing apparatuses. For example, the cutter assembly 204 may be rotatably mounted to the shaft 202 with a pair of bearing apparatuses 212A, 212B. In the illustrated embodiment, the bearing apparatuses 212A, 212B have the same components and features. Therefore, in the interest of brevity, the components and features of the bearing apparatuses 212A, 212B are provided with identical reference numbers, and an explanation thereof will not be repeated. For example, each of the bearing apparatuses 212A, 212B may include an inner race or stator 224 and an outer race or rotor 226. In an embodiment, the inner races 224 may be fixed attached to the shaft 202 via an inner member 217. The inner member 217 may include a pair of end retainer covers 218, 220 positioned on either side of the hub 208. During operation, the cutter assembly 204 may be rotatable about the shaft 202, and the end retainer covers 218, 220 may be fixed to the shaft 202. In an embodiment, a rotary seal group 222 may be positioned at the interface between each of the end retainer cover 218, 220 and the cutter assembly 204. The rotary seal group 222 may be configured to provide a seal to help prevent the entry of dirt, rock, water, or other contaminants that could damage or destroy the bearing apparatuses 212A, 212B.

The cutter ring 206 of the cutter assembly 204 may extend circumferentially about the central axis 230 and may include a radially outer surface 206A and a radially inner surface 206B defining an opening through which the shaft 202 may extend. The cutter ring 206 may be made from a variety of different materials. For example, the cutter ring 206 may comprise a metal, alloy steel, a metal alloy, carbon steel, stainless steel, tungsten carbide, or any other suitable metal or conductive or non-conductive material. In an embodiment, the cutter ring 206 may comprise an annular ring exhibiting a wedge-like cross-sectional geometric shape. For example, the cutter ring 206 may include a base portion 256 from which a pair of side portions 258 extend and converge to define a crest 260. While the cutter ring 206 is illustrated exhibiting a generally wedge-like cross-sectional shape, the cutter ring 206 may exhibit any suitable cross-sectional geometric shape. For example, the cutter ring 206 may exhibit a constant cross-sectional shape, a generally conical cross-sectional shape, a generally rectangular cross-sectional shape, a bell-like cross-sectional shape, an asymmetric cross-sectional shape, a generally triangular cross-sectional shape, a generally trapezoidal cross-sectional shape, combinations thereof, or any other suitable cross-sectional geometric shape. The cutter ring 206 may include a plurality of pockets 262 formed in the crest 260. In an embodiment, the pockets 262 may be arranged in a single row about a rotation axis 230. In other embodiments, the pockets 262 may be arranged in two rows, three rows, four rows, or any other suitable number of rows about the rotation axis 230.

In an embodiment, the cutter assembly 204 may include a plurality of cutting elements 264 attached to the cutter ring 206. Each of the cutting elements 264 may be distributed circumferentially about the central axis 230. In an embodiment, gaps 266 may be located between adjacent cutting elements 264. In an embodiment, at least one of, some of, or all of the gaps 266 may exhibit a width of about 0.00020 inches to 0.5 inches, such as about 0.00040 inches to 0.0010 inches, about 0.00040 inches to 0.080 inches, or 0.1 inches to 0.2 inches, 0.3 inches to 0.4 inches, or about 0.4 inches to 0.5 inches. In other embodiments, the gaps 266 may substantially be zero.

In an embodiment, one or more of the cutting elements 264 may have a generally domed hemispherical-like shape. In other embodiments, one or more of the cutting elements 264 may exhibit a generally rounded rectangular shape, a hemispherical shape, a pointed shape, a generally oval shape, a generally angular shape, combinations thereof, or any other suitable shape. Each cutting element 264 may include a superhard body 268 having a working upper surface 268A and an opposing back surface 268B. In an embodiment, the superhard body 268 may comprise a superhard layer 268D (e.g. a PCD layer) bonded or otherwise attached to a substrate 268E (e.g., tungsten carbide). Each cutting element 264 may optionally include multiple layers or other components. For instance, the back surface 268B of one or more of the cutting elements 264 may be bonded or otherwise attached to a backing portion.

The term "superhard," as used herein, means a material having a hardness at least equal to a hardness of tungsten carbide. In any of the embodiments disclosed herein, the superhard bodies (e.g., superhard body 268) may at least partially comprise one or more superhard materials, such as natural diamond, sintered PCD, polycrystalline cubic boron nitride, diamond grains bonded together with silicon carbide, or combinations of the foregoing. For example, cutting elements having a PCD body may be formed and bonded to a backing portion using an ultra-high pressure, ultra-high temperature ("HPHT") sintering process. Such cutting elements having a PCD body may be fabricated by placing a cemented carbide backing portion, such as a cobalt-cemented tungsten carbide substrate, into a container or cartridge with a volume of diamond particles positioned on a surface of the cemented carbide substrate. A number of such cartridges may be loaded into an HPHT press. The backing portions and diamond particles may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, or iron, which facilitates intergrowth and bonding of the diamond particles. In an embodiment, a constituent of the cemented carbide backing portion, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond gains.

In any of the embodiments disclosed herein, the polycrystalline diamond body may be leached to at least partially or substantially completely remove the metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from the upper working surface. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond body. Other examples of methods for fabricating the cutting elements and resulting PCD bodies are disclosed in U.S. Pat. Nos. 7,866,418; 7,842,111; and 8,236,074, the disclosure of each of which is incorporated herein, in its entirety, by this reference.

The diamond particles that may form the PCD in the superhard body may also exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 40 μm, 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and about 4 μm. In some embodiments, the diamond particles may comprise three or more different sizes (e.g., one relatively larger size and two or more relatively smaller sizes), without limitation. Upon HPHT sintering the diamond particles to form the polycrystalline diamond, the PCD may, in some cases, exhibit an average grain size that is the same or similar to any of the diamond particles sizes and distributions discussed above. Additionally, in any of the embodiments disclosed herein, the cutting elements 264 may be freestanding (e.g., substrateless) and formed from a PCD body that is at least partially or fully leached to remove a metal-solvent catalyst initially used to sinter the polycrystalline diamond body. In an embodiment, the leached PCD body may be formed to exhibit a porosity of about 1%-10% by volume. Optionally, the leached pores of the PCD body may be impregnated with lubricant to assist in minimizing friction caused by contact of rock materials on the cutter assembly 204. In other embodiments, the PCD body may exhibit a selected porosity that is higher or lower.

Figure 5:
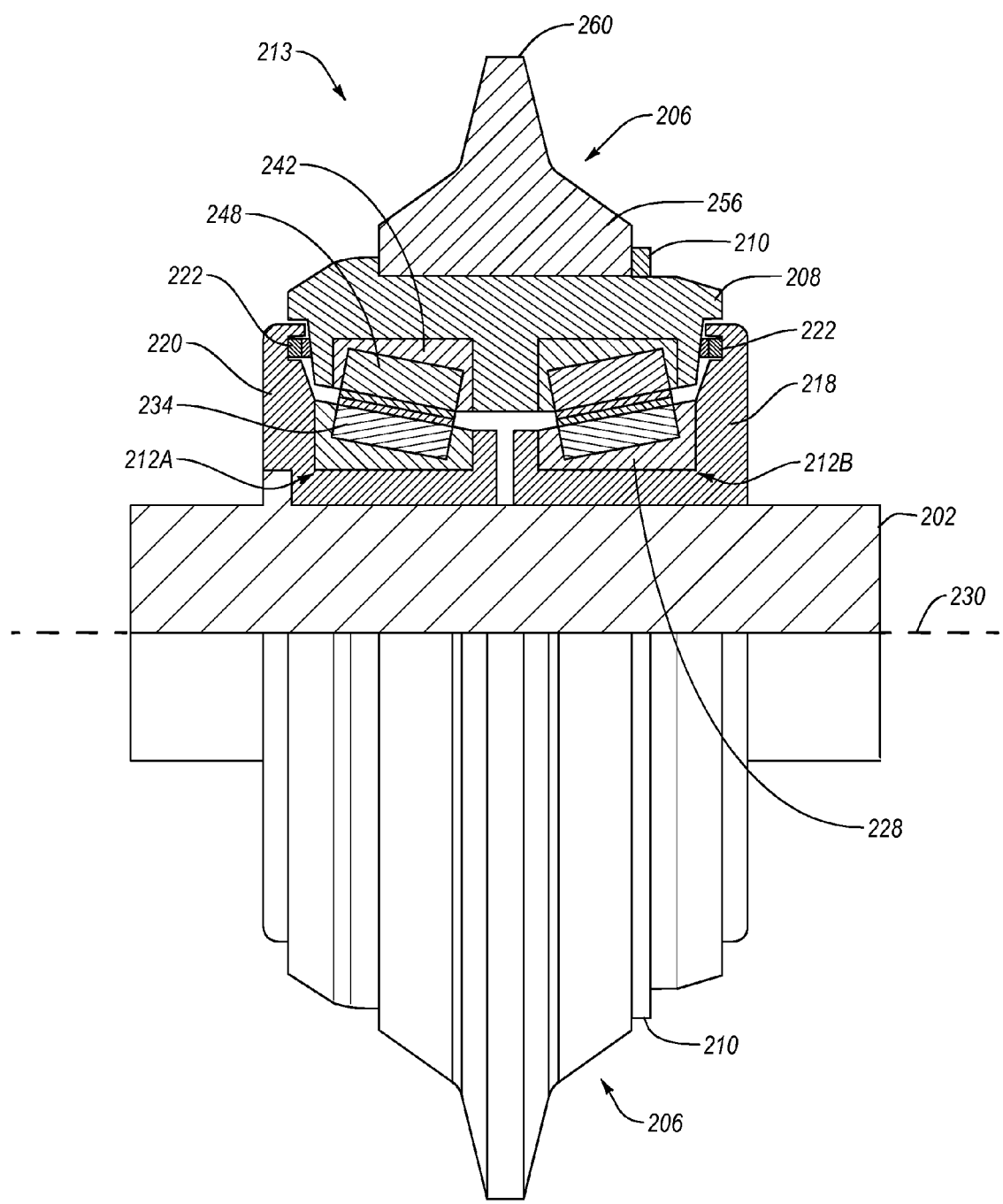
FIG. 5 is a partial, cross-sectional view of a disc cutter shown in FIG. 2 according to another embodiment.

A cutting surface is a substantially continuous or discontinuous surface or surfaces that are configured to contact and cut a target surface or a tunnel face. In an embodiment, the cutting elements 264 may be sized and configured to form a superhard cutting surface or cutting edge. For example, the cutting elements 264 may be positioned such that at least a portion of the working upper surface 268A of each cutting element 264 projects beyond the crest 260 of the cutter ring 206. By forming the cutting surface with the superhard bodies 268, deformation of the cutter ring 206, wear of the cutter assembly 204, and/or risk of fatigue may be reduced because the materials (e.g., rock) being cut by the cutter assembly 204 generally contact the cutting elements 264 rather than the cutter ring 206. Moreover, fatigue of the cutter assembly 204 at the contact surface between the superhard bodies 268 and the materials being cut may be reduced because the superhard bodies 268 do not deform as much as a traditional cutting surface (i.e., steel) due to the superhard material's high modulus of elasticity. For example, in an embodiment, the superhard body 268 may exhibit a modulus of elasticity between about 800 GPa and about 1200 GPa (e.g., about 800 GPa to about 850 GPa). In other embodiments, the superhard body 268 may exhibit a modulus of elasticity greater than about 800 GPa. In other embodiments, the superhard body 268 may exhibit a selected modulus of elasticity that is higher or lower. In an embodiment, the cutting elements 264 may enhance the general load capacity of the cutter assembly 204. Further, the cutting elements 264 may form a cutting surface that is more abrasive and resistant to corrosion than a traditional cutting surface (i.e., steel). Optionally, a relatively high thermal conductivity of the cutting elements 264 may also help reduce adhesive wear and resulting scuffing of the cutter ring 206. For example, the superhard cutting surface may exhibit a thermal conductivity of about 543 W/m-K, which is about twelve (12) times the thermal conductivity of steel. In other embodiments, the superhard cutting surface may exhibit a thermal conductivity of at least about 300 W/m-K; at least about 800 W/m-K; at least about 1300 W/m-K; or at least about 2000 W/m-K. In addition, the superhard cutting surface may exhibit a thermal conductivity of about 300 W/m-K to about 2000 W/m-K; about 700 W/m-K to about 1600 W/m-K; or about 1000 W/m-K to about 1300 W/m-K. In other embodiments, the thermal conductivity of the superhard cutting surface may be larger or smaller. Accordingly, heat generated by eventual skidding and/or slipping of the cutting elements 264 on rock materials may be quickly conducted away from the cutter ring 206. In other embodiments, the superhard cutting surfaces may exhibit thermal conductivities that are higher or lower. In other embodiments, the cutting elements 264 may be omitted. For example, as shown in FIG. 5, the cutter ring 206 may not include cutting elements and the cutting surface of the cutter ring 206 may be formed by the crest 260 of the cutter ring 206.

Referring again to FIG. 3, the cutting elements 264 may be mounted or otherwise attached to the cutter ring 206 in any suitable manner. For example, in an embodiment, the cutting elements 264 may be attached to the cutter ring 206 via brazing and press-fitting. In other embodiments, the cutting elements 264 may be attached to the cutter ring 206 via threadedly attaching, fastening with a fastener, combinations of the foregoing, or any other suitable technique.

Figure 4A:
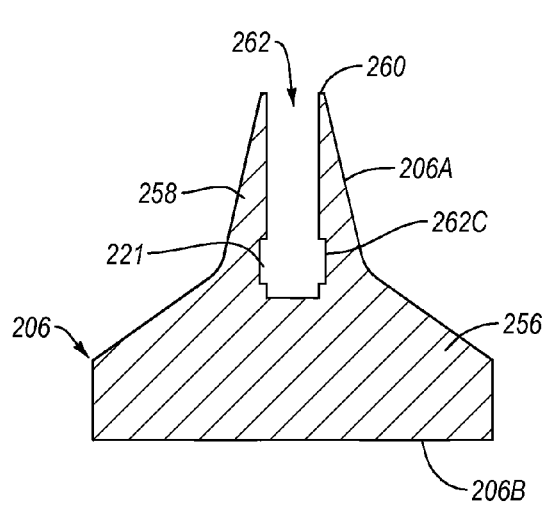
FIG. 4A is a partial, cross-sectional view of the cutter assembly shown in FIG. 3 having the cutting element removed according to another embodiment.
Figure 4B:
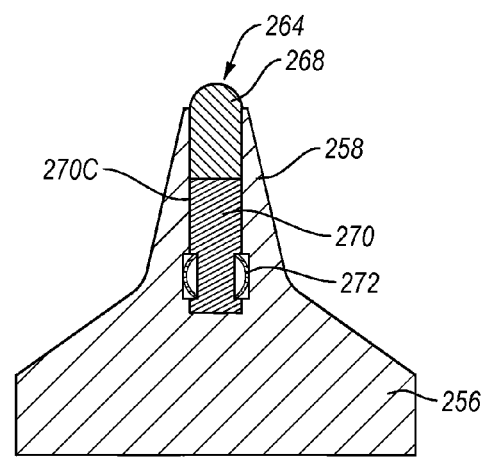
FIG. 4B is a partial, cross-sectional view of the cutter assembly shown in FIG. 4A having the cutting element attached.

In an embodiment, the cutter ring 206 may include one or more resilient or compressible features to help attach the cutting elements 264 in the pockets 262. FIGS. 4A and 4B illustrate partial, cross-sectional views of the cutting assembly 204 according to yet another embodiment. The cutting elements 264 may comprise the superhard body 268 bonded or otherwise attached to an elongated backing portion 270. The backing portion 270 may be formed from any number of different materials. Materials suitable for the backing portion 270 may include, without limitation, carbon steel, high tensile strength steel, cemented carbides, such as tungsten carbide, titanium carbide, chromium carbide, niobium carbide, tantalum carbide, Invar, vanadium carbide, or combinations thereof cemented with iron, nickel, cobalt, or alloys thereof. For example, in an embodiment, the backing portion 270 comprises cobalt-cemented tungsten carbide.

Each of the cutting elements 264 may be partially disposed and secured in a corresponding one of the pockets 262 of the cutter ring 206. In an embodiment, the pockets 262 may be sized and configured such that the backing portions 270 of the cutting elements 264 and the pockets 262 form a generally longitudinal fit. Forming a longitudinal fit between the cutting elements 264 and the pockets 262 may help reduce the risk of the cutting elements being pried or pivoted out of the pockets 262. In an embodiment, the backing portion 270 may include a spring-type retainer 272 positioned within a groove formed in a side surface 270C of the backing portion 270. The spring-type retainer 272 may be configured to help secure or attach the cutting element 264 in the pocket 262. In an embodiment, the spring-type retainer 272 may comprise a snap ring, including one or more bands or portions of a generally spherical shell, an elliptical shell, or any other suitable compressible resilient retainer. When the cutting element 264 is inserted in the pocket 262, the side surface 262C of the pocket 262 may force the snap ring 272 toward the side surface 270C of the backing portion 270. In response, the snap ring 272 may resiliently exert an outward force against the side surface 262C of the pockets 262. Optionally, the snap ring 272 may be positionable within one or more grooves or slots 221 formed in the side surface 262C of the pockets 262 to help secure or attach the cutting element 264 in the pocket 262. While the spring-type retainer 272 is described as a snap ring, in other embodiments the spring-type retainer 272 may comprise one or more compressible members (e.g. compressible rubber), one or more spring-like bars, one or more wave-like members, one or more retaining rings, a c-clip, a pin, combinations thereof, or any other suitable retainer member.

Other examples of methods of attaching the cutting elements to the cutter ring are disclosed in co-pending U.S. Patent Application, entitled "Cutter Assemblies, Disc Cutters, and Related Methods of Manufacture," filed on Mar. 8, 2013 having application Ser. No. 13/790,019, the disclosure of which is incorporated herein, in its entirety, by this reference.

Figure 6:
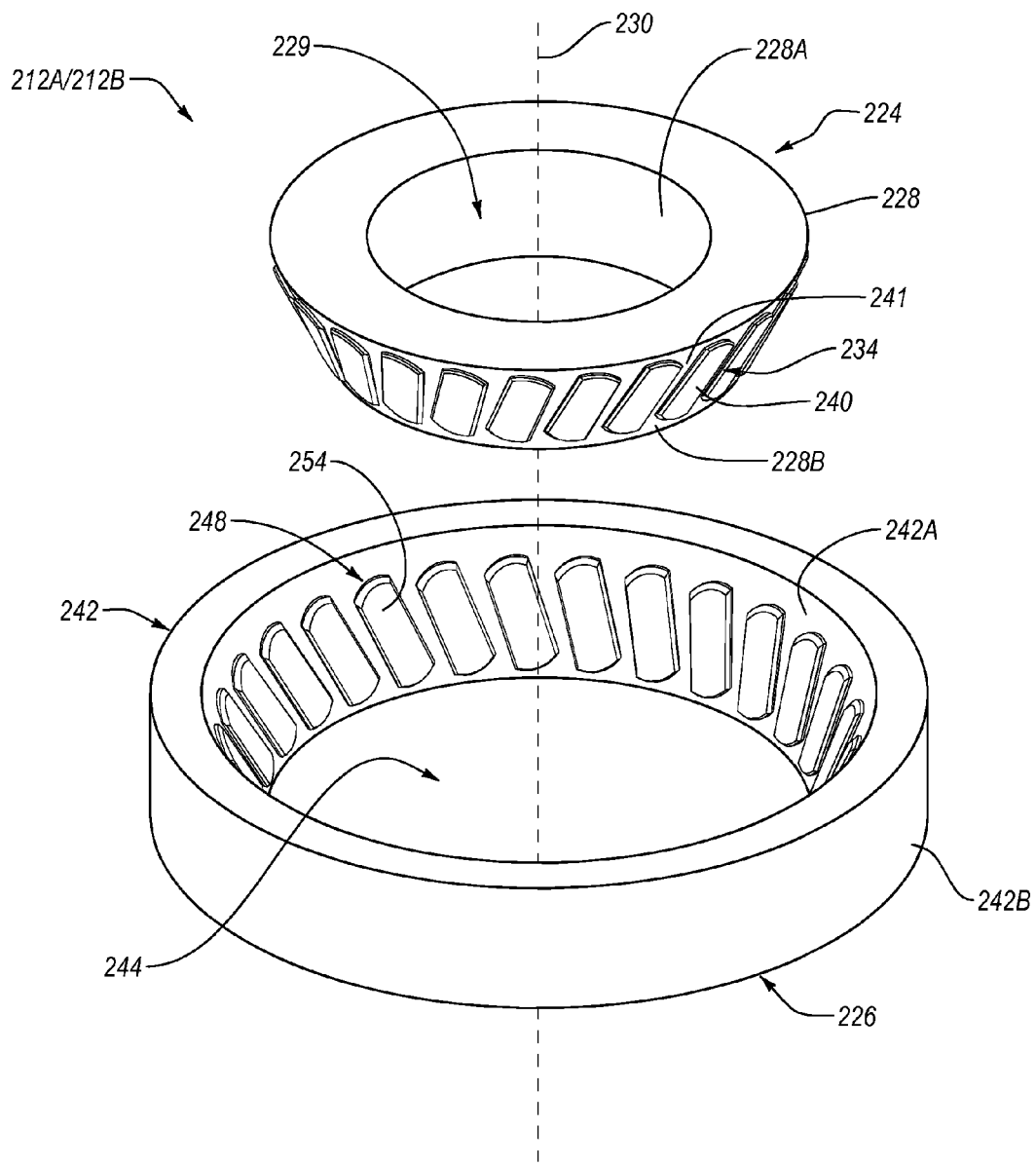
FIG. 6 is an exploded isometric view of a bearing apparatus removed from the disc cutter shown in FIG. 2.

In the illustrated embodiment, the disc cutter 213 may include two bearing apparatuses 212A, 212B rotatably mounting the cutter assembly 204 to the shaft 202. While the cutter assembly 204 is shown rotatably mounted to the shaft 202 via two bearing apparatuses, in other embodiments, the cutter assembly 204 may be rotatably mounted to the shaft 202 via one, three, four, or any other suitable number of bearing apparatuses. Referring again to FIGS. 3 and 6, in an embodiment, each of the bearing apparatus 212A, 212B may comprise a tapered sliding contact bearing apparatus including an inner race 224 (e.g., stator) and an outer race 226 (e.g., rotor). The terms "rotor" and "stator" refer to rotating and stationary components of the bearing apparatus 212A, 212B, respectively. Thus, if the inner race 224 is configured to remain stationary, the inner race 224 may be referred to as the stator and the outer race 226 may be referred to as the rotor.

The inner race 224 may include a support ring 228 extending circumferentially about the central axis 230. The support ring 228 may define an opening 229 through which the shaft 202 may extend. The support ring 228 may be made from a variety of different materials. For example, the support ring 228 may comprise a metal, alloy steel, a metal alloy, carbon steel, stainless steel, tungsten carbide, or another suitable material. The support ring 228 may include a plurality of recesses 232 formed in a radially outer surface 228B of the support ring.

In an embodiment, a plurality of superhard bearing elements 234 may be attached to the support ring 228. Each of the superhard bearing elements 234 may be partially disposed in a corresponding one of the recesses 232 of the support ring 228 and secured partially therein via brazing, press-fitting, threadedly attaching, fastening with a fastener, combinations of the foregoing, or another suitable technique. As illustrated, the superhard bearing elements 234 may be distributed circumferentially about the central axis 230 in a single row. In other embodiments, the superhard bearing elements 234 may be circumferentially distributed in two rows, three rows, four rows, or any other number of rows. In an embodiment, at least some of the superhard bearing elements 234 may comprise a superhard table 238 including a convexly-curved bearing surface 240 (i.e., curving to lie on an imaginary conical or spherical surface). Each of the superhard tables 238 may be bonded to a corresponding substrate 236. The superhard bearing surfaces 240 of the superhard tables 238 may collectively form a superhard bearing surface of the inner race 224.

In an embodiment, one or more of the superhard bearing elements 234 may have a generally rounded rectangular shaped body. While the superhard bearing elements 234 are shown having a round rectangular shaped body, in other embodiments, one or more of the superhard bearing elements 234 may include a generally cylindrical shaped body, a generally oval shaped body, a generally wedge shaped body, or any other suitable shaped body. Optionally, one or more of the superhard bearing elements 234 may exhibit a peripherally extending edge chamfer. However, in other embodiments, the edge chamfer may be omitted.

In the illustrated embodiment, gaps 241 or other offsets may be located between adjacent ones of the superhard bearing elements 234. In an embodiment, at least one of, some of, or all of the gaps 241 may exhibit a width of about 0.00020 inches to 0.5 inches, such as about 0.00040 inches to 0.0010 inches, about 0.00040 inches to 0.080 inches, or 0.1 inches to 0.2 inches, 0.3 inches to 0.4 inches, or about 0.4 inches to 0.5 inches. In other embodiments, the gaps 241 may substantially be zero.

As used herein, a "superhard bearing element" is a bearing element including a bearing surface that is made from a material exhibiting a hardness that is at least as hard as tungsten carbide. In any of the embodiments disclosed herein, the superhard bearing elements (e.g., superhard bearing elements 234) may be made from any of the superhard materials use to make the superhard cutting elements 264. For example, the superhard bearing elements 234 may be made from polycrystalline diamond, polycrystalline cubic boron nitride, silicon carbide, tungsten carbide, or any combination of the foregoing superhard materials. The superhard bearing elements having a PCD table may be formed and bonded to a substrate using an HPHT sintering process. Such superhard bearing elements having a PCD table may be fabricated by placing a cemented carbide substrate, such as a cobalt-cemented tungsten carbide substrate, into a container or cartridge with a volume of diamond particles positioned on a surface of the cemented carbide substrate.

The outer race 226 may be configured as a rotor that extends about and receives the inner race 224 (i.e., stator). The outer race 226 may be generally configured similar to the inner race 224. For example, the outer race 226 may include a support ring 242 extending circumferentially about the central axis 230 and a plurality of superhard bearing elements 248 attached to the support ring 242. In an embodiment, the support ring 242 may include a plurality of recesses 246 formed in the inner surface 242A that are configured to generally correspond to the recesses 232 formed in the support ring 228 of the inner race 224.

The support ring 242 may include the radially inner surface 242A defining a central opening 244 that is capable of receiving the inner race 224. In an embodiment, the outer race 226 may be configured as a cup and the inner race 224 may be configured as a cone. For example, the inner surface 242A (into which the superhard bearing elements 248 are positioned) of the support ring 242 may be substantially incongruent relative to the outer surface 242B of the support ring 242 and substantially congruent relative to the outer surface 228B of the support ring 228. The outer surface 228B of the support ring 228 may be curved to lie substantially on an imaginary conical surface. Further, the inner surface 228A of the support ring 228 may be substantially incongruent relative to the outer surface 228B of the support ring 228 and substantially congruent to the outer surface 242B of the support ring 242.

When one or more of the tapered bearing apparatuses 212A/212B is loaded with an external force, the geometric relationship of the inner race 224 and the outer race 226 may accommodate the external force. Such a configuration may allow the bearing apparatuses 212A/212B to support both radial and axial loads. In addition, the geometric relationship and/or curvature of the bearing surfaces of the bearing elements may help allow for some degree of shaft misalignment and/or deflection during operation.

The plurality of superhard bearing elements 248 may be attached to the support ring 242. At least some of the superhard bearing elements 248 may comprise a superhard table 250 including a concavely-curved bearing surface 254 curved to generally correspond to the convexly-curved bearing surfaces 240. Each of the superhard tables 250 may be bonded to a corresponding substrate 252. The superhard bearing surfaces 254 of the superhard tables 250 may collectively form a superhard bearing surface of the outer race 226. The superhard bearing elements 248 may exhibit any selected geometric shape. For example, in some embodiments, the superhard bearing elements 248 may have a generally rounded rectangular shape, a cylindrical shape, a wedge-like shape, or any other suitable geometric shape. The superhard bearing elements 248 may be made from any of the materials discussed above for the superhard bearing elements 234.

In an embodiment, each of the superhard bearing elements 248 may be partially disposed in a corresponding one of the recesses 246 of the support ring 242 and secured partially therein via brazing, press-fitting, threadedly attaching, fastening with a fastener, combinations of the foregoing, or another suitable technique. During operation, the bearing surfaces 234 of the inner race 224 may slidably contact the bearing surfaces 254 of the outer race 226. By forming the bearing surfaces with the superhard bearing elements 234, 248, wear of the bearing apparatus, and/or risk of fatigue may be reduced because the superhard bearing elements 234, 248 generally contact each other rather than the support rings 228, 242. Moreover, fatigue of the bearing apparatus 212A/212B at the contact surface between the superhard bearing elements 234, 248 may be reduced because the superhard bearing elements 234, 248 do not deform as much as a traditional bearing surface (i.e., steel) due the superhard material's high modulus of elasticity. For example, in an embodiment, the superhard bearing elements 234, 248 may exhibit a modulus of elasticity between about 800 GPa and about 1200 GPa (e.g., about 800 GPa to about 850 GPa). In other embodiments, the superhard bearing elements 234, 248 may exhibit a selected modulus of elasticity that is higher or lower. Optionally, a relatively high thermal conductivity of the superhard bearing elements 234, 248 may also help reduce adhesive wear and resulting scuffing of the support rings 228, 242. For example, the superhard bearing surfaces 240, 254 may exhibit a thermal conductivity of about 543 W/m-K, which is about twelve (12) times the thermal conductivity of steel. In other embodiments, the superhard bearing surfaces 240, 254 may exhibit a thermal conductivity of at least about 300 W/m-K; at least about 800 W/m-K; at least about 1300 W/m-K; or at least about 2000 W/m-K. In addition, the superhard bearing surfaces 240, 254 may exhibit a thermal conductivity of about 300 W/m-K to about 2000 W/m-K; about 700 W/m-K to about 1600 W/m-K; or about 1000 W/m-K to about 1300 W/m-K. In other embodiments, the thermal conductivity of the superhard bearing surfaces 240, 254 may be larger or smaller.

While the superhard bearing elements 248 are shown configured similarly to one another and the superhard bearing elements 234, in other embodiments, the superhard bearing elements 248 may have shapes and/or sizes that vary from one another and/or the superhard bearing elements 234. For example, one or more of the superhard bearing elements 248 may have a generally rounded rectangular shaped body, a generally elliptical shaped, a generally wedge shaped body, or any other suitably shaped body. In other embodiments, at least one of the superhard bearing elements 248 may have a generally rectangular shaped body and at least one of the superhard bearing elements 234 may have a generally elliptical shaped body. In yet other embodiments, at least one of the superhard bearing elements 248 may be sized larger than at least one of the superhard bearing elements 234. In other embodiments, the superhard bearing elements 234 and/or the superhard bearing elements 248 may be configured as any of the superhard bearing elements disclosed in U.S. Pat. No. 7,896,551; U.S. patent application Ser. No. 13/213,382; or U.S. patent application Ser. No. 13/480,932, the disclosure of each of which is incorporated herein, in its entirety, by this reference. In some embodiments, the superhard bearing elements 234 and/or the superhard bearing elements 248 may be widely spaced as disclosed in U.S. Pat. No. 8,277,124, the disclosure of which is incorporated herein, in its entirety, by this reference.

Figure 7:
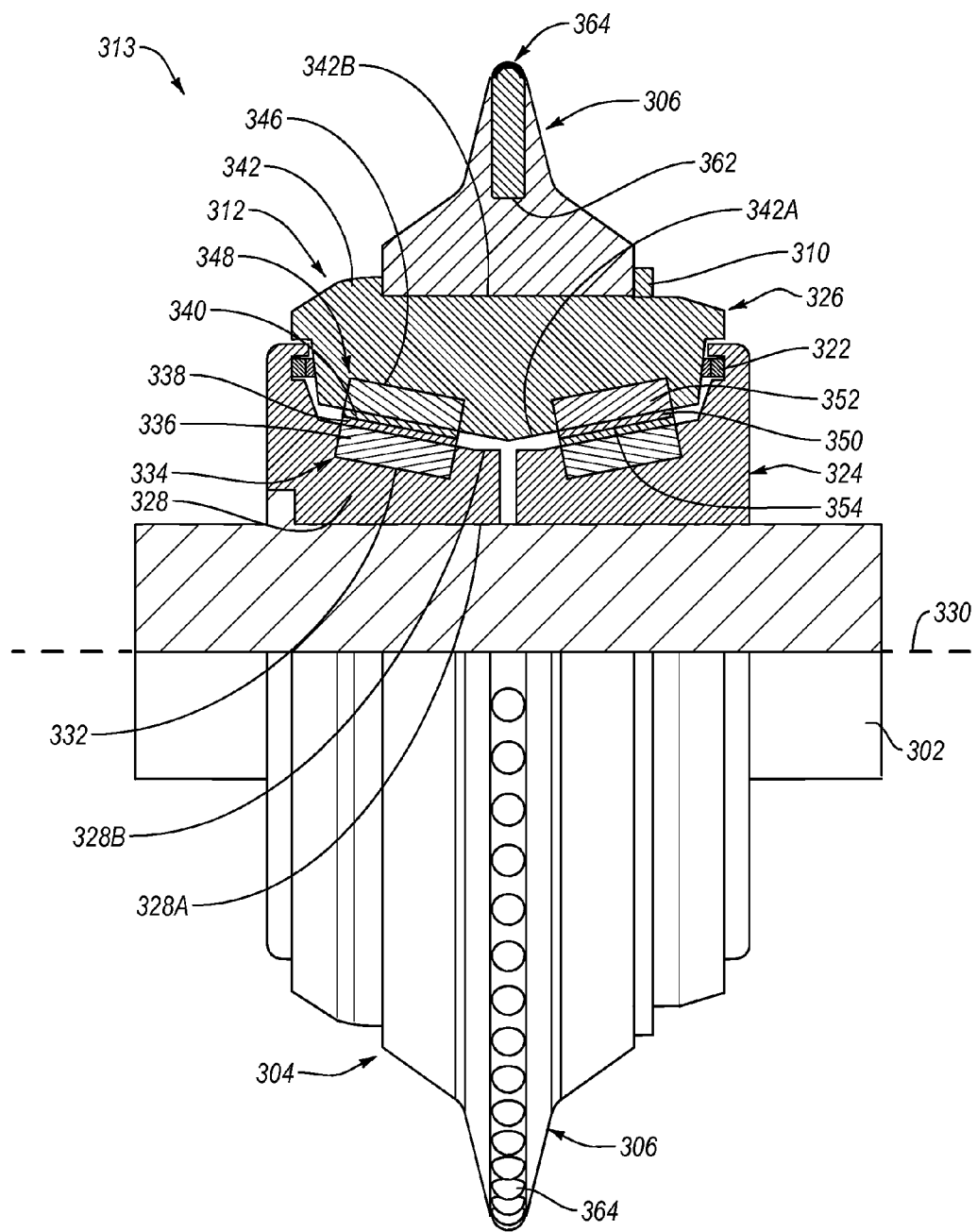
FIG. 7 is a partial, cross-sectional view of a disc cutter according to another embodiment.

Embodiments of the invention contemplate that any of the disc cutters disclosed herein may employ a variety of different bearing apparatuses, including, but not limited to, tapered roller bearings, double row bearings, angular contact bearings, ball bearings, spherical roller bearings, radial roller bearings, roller bearings, combinations thereof, or any other suitable type of bearing. For example, FIG. 7 illustrates a disc cutter 313 according to another embodiment that includes a single tapered sliding contact bearing apparatus 312.

The disc cutter 313 may include a shaft 302 configured to be fixedly attached to the head 11 (see FIG. 1). The disc cutter 313 may further include a cutter assembly 304 including a cutter ring 306 extending circumferentially about a central axis 330 and a plurality of superhard cutting elements 364 attached to the cutter ring 306. As shown, the cutter ring 306 may include a plurality of pockets 362 arranged in a single row about the central axis 330. Each of the cutting elements 364 (e.g., superhard bodies) may be partially disposed in a corresponding one of the pockets 362 and secured therein via brazing, press-fitting, threadedly attaching, fastening with a fastener, combinations of the foregoing, or any other suitable technique.

In an embodiment, the cutter assembly 304 may be rotatably mounted to the shaft 302 via at least one tapered sliding contact bearing apparatus 312. The bearing apparatus 312 may include an inner race 324 (e.g., stator) and an outer race (e.g., rotor 326). In an embodiment, the cutter ring 306 may be attached to a radially outer surface of the rotor 326 with a retainer member 310. A rotary seal group 322 may be positioned at the interface the stator 324 and the rotor 326. The rotary seal group 322 may be configured to provide a seal to help prevent entry of dirt, rock, water, or other contaminants that could damage or destroy the bearing apparatus 312.

The inner race 324 of the bearing apparatus 312 may include a support ring 328 extending circumferentially about the central axis 330. The support ring 328 may define an opening through which the shaft 302 may extend. The support ring 328 may be made from a variety of different materials. For example, the support ring 328 may comprise a metal, alloy steel, a metal alloy, carbon steel, stainless steel, tungsten carbide, or another suitable material. The support ring 328 may include a plurality of recesses 332 formed in a radially outer surface 328B of the support ring. In an embodiment, two rows of recesses 332 may extend about the central axis 330. Optionally, the support ring 328 may be configured as a split ring, as two separate parts, or separable into two or more parts. Such a configuration may facilitate attaching and/or detaching the support ring 328 from the shaft 302.

In an embodiment, a plurality of superhard bearing elements 334 may be attached to the support ring 328. In any of the embodiments disclosed herein, the superhard bearing elements 334 may be made from any of the superhard materials disclosed herein. For example, the superhard bearing elements 334 may be made from polycrystalline diamond, polycrystalline cubic boron nitride, silicon carbide, tungsten carbide, or any combination of the foregoing superhard materials. Each of the superhard bearing elements 334 may be partially disposed in a corresponding one of the recesses 332 of the support ring 328 and secured partially therein via brazing, press-fitting, threadedly attaching, fastening with a fastener, combinations of the foregoing, or another suitable technique. As illustrated, the superhard bearing elements 334 may be distributed circumferentially about the central axis 330 in two rows. In other embodiments, the superhard bearing elements 334 may be circumferentially distributed in three rows, four rows, or any other number of rows. In an embodiment, at least some of the superhard bearing elements 334 may comprise a superhard table 338 including a convexly-curved bearing surface 340 (i.e., curving to lie on an imaginary conical or spherical surface). Each of the superhard tables 338 may be bonded to a corresponding substrate 336. The superhard bearing surfaces 340 of the superhard tables 338 may collectively form a superhard bearing surface of the inner race 324. As described above with respect to bearing apparatuses 212A/212B, gaps or other offsets may be located between adjacent ones of the superhard bearing elements 334. In an embodiment, at least one of, some of, or all of the gaps may exhibit a width of about 0.00020 inches to 0.5 inches, such as about 0.00040 inches to 0.0010 inches, about 0.00040 inches to 0.080 inches, or 0.1 inches to 0.2 inches, 0.3 inches to 0.4 inches, or about 0.4 inches to 0.5 inches. In other embodiments, the gaps may substantially be zero.

In an embodiment, one or more of the superhard bearing elements 334 may have a generally rounded rectangular shaped body. While the superhard bearing elements 334 are shown having a round rectangular shaped body, in other embodiments, one or more of the superhard bearing elements 334 may include a generally cylindrical shaped body, a generally oval shaped body, a generally wedge shaped body, or any other suitable shaped body. Optionally, one or more of the superhard bearing elements 334 may exhibit a peripherally extending edge chamfer. However, in other embodiments, the edge chamfer may be omitted.

The outer race 326 may be configured as a rotor that extends about and receives the inner race 324 (i.e., stator). The outer race 326 may be generally configured similar to the inner race 324. For example, the outer race 326 may include a support ring 342 extending circumferentially about the central axis 330. In an embodiment, the support ring 342 may include a plurality of recesses 346 formed in the inner surface 342A that are configured to generally correspond to the recesses 332 formed in the support ring 328 of the inner race 324. The support ring 342 may include a radially inner surface 342A defining a central opening that is capable of receiving the inner race 324. In an embodiment, the outer race 326 may be configured as a cup and the inner race 324 may be configured as a cone. For example, the inner surface 342A (into which the superhard bearing elements 348 are positioned) of the support ring 342 may be substantially incongruent relative to the outer surface 342B of the support ring 342 and substantially congruent relative to the outer surface 328B of the support ring 328. The outer surface 328B of the support ring 328 may be curved to lie substantially on an imaginary conical surface. Further, the inner surface 328A of the support ring 328 may be substantially incongruent relative to the outer surface 328B of the support ring 328 and substantially congruent to the outer surface 342B of the support ring 342.

When the tapered bearing apparatus 312 is loaded with an external force, the geometric relationship of the inner race 324 and the outer race 326 may accommodate the external force. Such a configuration may allow the bearing apparatus 312 to support both radial and axial loads. In addition, the geometric relationship and/or curvature of the bearing surfaces of the bearing elements may help allow for some degree of shaft misalignment and/or deflection during operation.

A plurality of superhard bearing elements 348 may be attached to the support ring 342. At least some of the superhard bearing elements 348 may comprise a superhard table 350 including a concavely-curved bearing surface 354, curved to generally correspond to the convexly-curved bearing surfaces 340. Each of the superhard tables 350 may be bonded to a corresponding substrate 352. The superhard bearing surfaces 354 of the superhard tables 350 may collectively form a superhard bearing surface of the outer race 326. The superhard bearing elements 348 may exhibit any selected geometric shape. For example, in some embodiments, the superhard bearing elements 348 may have a generally rounded rectangular shape, a cylindrical shape, a wedge-like shape, or any other suitable geometric shape. The superhard bearing elements 348 may be made from any of the materials discussed above for the superhard bearing elements 334. While the superhard bearing elements 348 are shown configured similarly to one another and the superhard bearing elements 334, in other embodiments, the superhard bearing elements 348 may have shapes and/or sizes that vary from one another and/or the superhard bearing elements 334.

In an embodiment, each of the superhard bearing elements 348 may be partially disposed in a corresponding one of the recesses 346 of the support ring 342 and secured partially therein via brazing, press-fitting, threadedly attaching, fastening with a fastener, combinations of the foregoing, or another suitable technique. During operation, the bearing surfaces 340 of the inner race 324 may slidably contact the bearing surfaces 354 of the outer race 326. By forming the bearing surfaces with the superhard bearing elements 334, 348, wear of the bearing apparatus, and/or risk of fatigue may be reduced because the superhard bearing elements 334, 348 generally contact each other rather than the support rings 328, 342. Moreover, fatigue of the bearing apparatus 312 at the contact surface between the superhard bearing elements 334, 348 may be reduced because the superhard bearing elements 334, 348 do not deform as much as a traditional bearing surface (i.e., steel) due the superhard material's high modulus of elasticity. Optionally, a relatively high thermal conductivity of the superhard bearing elements 334, 348 may also help reduce adhesive wear and resulting scuffing of the support ring 328, 342.

Figure 8:
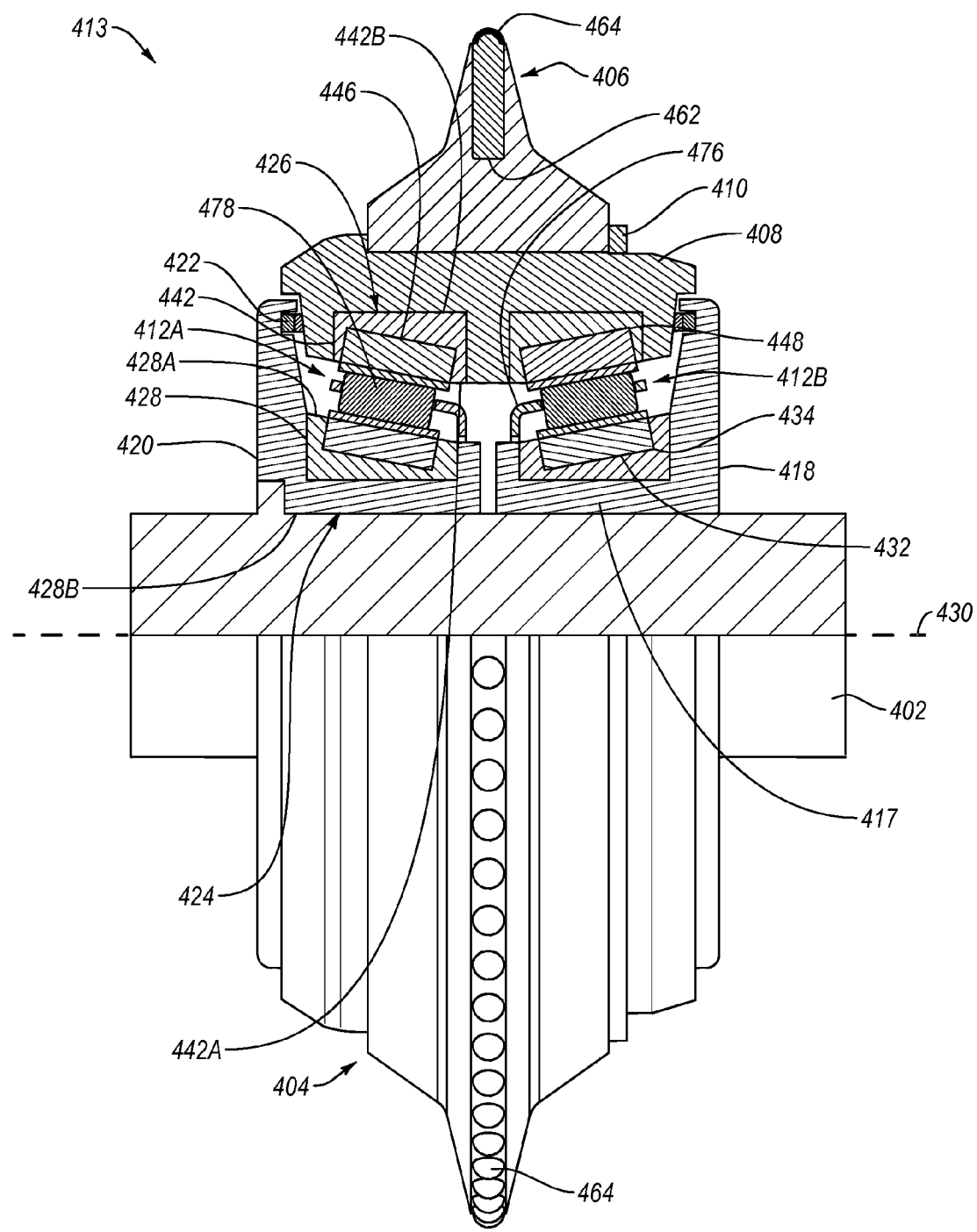
FIG. 8 is a partial, cross-sectional view of a disc cutter according to another embodiment.
Figure 9:
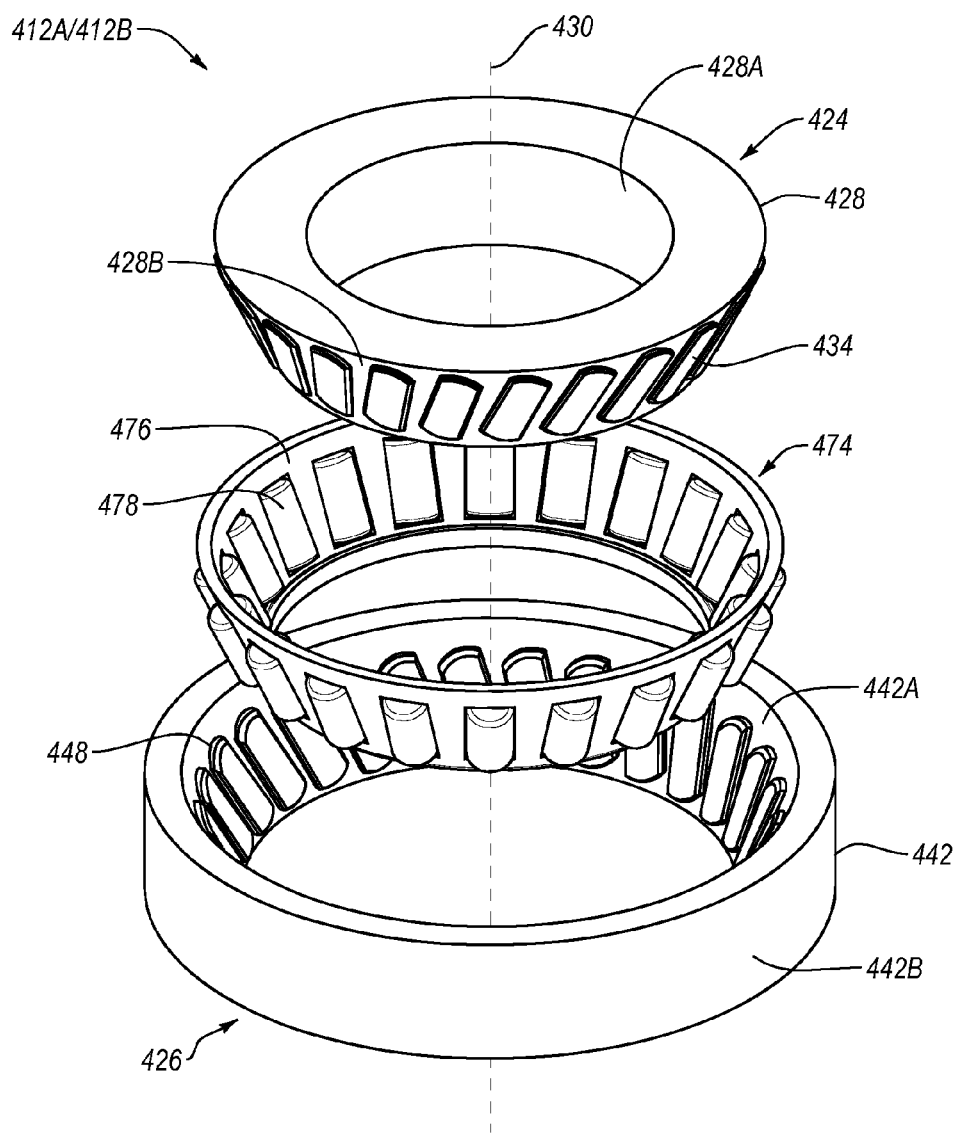
FIG. 9 is an exploded isometric view of a bearing apparatus removed from the disc cutter shown in FIG. 8.

FIG. 8 is a partial cross-sectional view of a disc cutter 413 including one or more tapered roller bearing apparatuses according to another embodiment. FIG. 9 is an exploded view of one of the tapered roller bearing apparatuses removed from the disc cutter 413. It should be noted that the principles of disc cutter 413 may be employed with any of the embodiments described with respect to FIG. 1 through FIG. 7 and vice versa.

The disc cutter 413 may include a shaft 402 configured to be fixedly attached to the head 11 (shown in FIG. 1). The disc cutter 413 may further include a cutter assembly 404 including a cutter ring 406 extending circumferentially about a central axis 430 and a plurality of superhard cutting elements 464 attached to the cutter ring 406. As shown, the cutter ring 406 may include a plurality of pockets 462 arranged in a single row about the central axis 430. Each of the cutting elements 464 (e.g., superhard bodies) may be partially disposed in a corresponding one of the pockets 462 and secured therein via brazing, press-fitting, threadedly attaching, fastening with a fastener, combinations of the foregoing, or any other suitable technique. The cutter ring 406 may be attached to a hub 408 with a retainer member 410. A pair of end retainer covers 418, 420 may be positioned on either side of the hub 408. During operation, the cutter assembly 404 may be rotatable about the shaft 402, and the end retainer covers 418, 420 may be fixed to the shaft 402.

In an embodiment, the cutter assembly 404 may be rotatably mounted to the shaft 402 via two tapered roller bearing apparatuses 412A, 412B. In an embodiment, a rotary seal group 422 may be positioned at the interface between each of the end retainer covers 418, 420 and the cutter assembly 404. The rotary seal group 422 may be configured to provide a seal to help prevent entry of dirt, rock, water, or other contaminants that could damage or destroy the bearing apparatuses 412A, 412B. While the cutter assembly 404 is shown rotatably mounted to the shaft 402 via two tapered roller bearing apparatuses, in other embodiments, the cutter assembly 404 may be rotatably mounted to the shaft 402 via one, three, five, or any other suitable number of tapered roller bearing apparatuses.

In the illustrated embodiment, the bearing apparatuses 412A, 412B have the same components and features. Therefore, in the interest of brevity, the components and features of the bearing apparatuses 412A, 412B are provided with identical reference numbers, and an explanation thereof will not be repeated. In an embodiment, each tapered roller bearing apparatus 412A, 412B may include an inner race 424, an outer race 426, and a roller assembly 474. The inner race 424 may include a support ring 428 and a plurality of superhard raceway elements 434 attached to the support ring 428. In an embodiment, each of the inner races 424 may be fixedly attached to the shaft 402 via an inner member 417. The outer race 426 may extend about and receive the inner race 424 and the roller assembly 474. The outer race 426 may include a support ring 442 extending circumferentially about a central axis 430 and a plurality of superhard raceway elements 448 attached to the support ring 442. The roller assembly 474 may be interposed between the inner race 424 and the outer race 426 and may include a cage 476 and a plurality of rolling elements 478. A raceway is a substantially continuous or discontinuous surface or surfaces over which the rolling elements 478 roll over/run on. Rotation of the inner race 424 and/or the outer race 426 may cause the rolling elements 478 to roll or run on the raceway formed between the superhard raceway elements 434, 448. The rolling elements 478 and/or the superhard raceway elements 434, 448 may include one or more features, either alone or in combination, configured to help reduce wear and/or failure of (e.g., flaking, strain, pitting, or combinations thereof) of the tapered roller bearing apparatus 412A, 412B. For example, in an embodiment, the rolling elements 478 may be include one or more metallic materials (e.g., steel or a superelastic alloy) and/or non-superhard materials and the raceway may include one or more superhard materials such as polycrystalline diamond, polycrystalline cubic boron nitride, silicon carbide, tungsten carbide, or any combination of the foregoing superhard materials. By varying the material design between the rolling elements 478 and/or the raceway, common failure modes such as welding, galling, and/or scuffing may be reduced.

The inner race 424 may form a stator of the tapered roller bearing apparatus 413. The support ring 428 may also include a plurality of recesses 432 formed therein. Each of the superhard raceway elements 434 may be partially disposed in a corresponding one of the recesses 432 of the support ring 428 and secured partially therein via brazing, press-fitting, threadedly attaching, fastening with a fastener, combinations of the foregoing, or another suitable technique. In an embodiment, each of the plurality of superhard raceway elements 434 may include a substrate 436 and a superhard table 438 bonded to the substrate 436. The superhard raceway elements 434 may be made from the same materials as the superhard bearing elements 234. The superhard raceway elements 434 may have any suitable individual shape. For example, one or more of the superhard raceway elements 434 may have a generally rounded rectangular-shaped body. In other embodiments, the superhard raceway elements 434 may have a generally elliptical shape, a generally wedge-like shape, a generally cylindrical shape, or any other suitable body shape.

Referring still to FIGS. 8 and 9, the outer race 426 (e.g., rotor) of each of the tapered roller bearing apparatuses 412A, 412B may exhibit a configuration similar to the inner race 424. For example, the outer race 426 may include the support ring 442 and the superhard raceway elements 448 mounted or otherwise attached to the support ring 442 in recesses 446 formed in an inner surface 442A of the support ring 442. In an embodiment, the support ring 428 of the inner race 424 may be configured as a cone and the support ring 442 may be configured as a cup. For example, the support ring 442 may extend about and receive the support ring 428. The inner surface 428A of the support ring 428 may be substantially incongruent relative to a radially outer surface 428B (into which the superhard raceway elements 434 are positioned) of the support ring 428 and substantially congruent relative to the outer surface 442B of the support ring 442. The outer surface 442B of the support ring 442 may be curved to lie substantially on an imaginary cylindrical surface. Further, the inner surface 442A (into which the superhard raceway elements 448 are positioned) of the support ring 442 may be not parallel or substantially incongruent relative to the outer surface 442B of the support ring 442 and substantially parallel or substantially congruent relative to the curved outer surface 428B of the support ring 428.

As shown, the roller assembly 474 may be interposed between the inner race 424 and the outer race 426. The roller assembly 474 may include a cage 476 and a plurality of generally cylindrical rolling elements 478. In an embodiment, the support ring 428 and/or the support ring 442 may include respective flange features (not shown) configured to help maintain the rolling elements 478 between the inner race 424 and the outer race 426. In other embodiments, the flange features may be omitted from both the support ring 428 and the support ring 442.

In an embodiment, the superhard raceway elements 434 of the inner race 424 and the superhard raceway elements 448 of the outer race 426 may be positioned and configured to at least partially define the raceway for the rolling elements 478 to run over or roll on during use. For example, the superhard raceway elements 434 may be positioned and configured to form a portion of the raceway on the outer surface 428B of the support ring 428 curved to lie substantially on an imaginary conical surface. Similarly, the superhard raceway elements 448 may be positioned and configured to form another portion of the raceway curved to lie substantially on an imaginary conical surface.

In an embodiment, the cage 476, including the rolling elements 478, may form at least a portion of a cone (e.g., a frustoconical ring) and may be configured to be interposed between the conical inner surface 442A of the support ring 442 and the conical outer surface 428B of the support ring 428. When the tapered roller bearing apparatus 413 is loaded with an external force, the conical geometric relationship of inner surface 442A and the outer surface 428B may accommodate the external force. Such a configuration may allow the tapered roller bearing apparatus 413 to support both radial and axial loads. In addition, the conical geometric relationship and/or curvature of the raceway may help allow for some degree of shaft misalignment and/or deflection during operation.

While the raceway is shown including one or more portions curved to lie substantially on an imaginary conical surface, one or more portions of the raceway may be curved to lie substantially on an imaginary spherical surface or another curved surface. Moreover, while generally cylindrical rolling elements 478 are illustrated, in other embodiments, the cage 476 may include one or more tapered rolling elements 478, one or more generally spherical rolling elements 478 (e.g., a crowned (barrel) type shape), and/or one or more rolling elements 478 having other suitable geometric shapes. In other embodiments, the tapered roller bearing apparatuses 412A, 412B may exhibit different configurations. For example, one or more of the roller bearing apparatuses 412A, 412B may be configured as a radial roller bearing apparatus or an angular contact bearing apparatus including one or more superhard raceway elements and/or rolling elements. Other examples of roller bearing apparatuses are disclosed in U.S. patent application Ser. No. 13/713,096, the disclosure of which is incorporated herein, in its entirety, by this reference.

Figure 10:
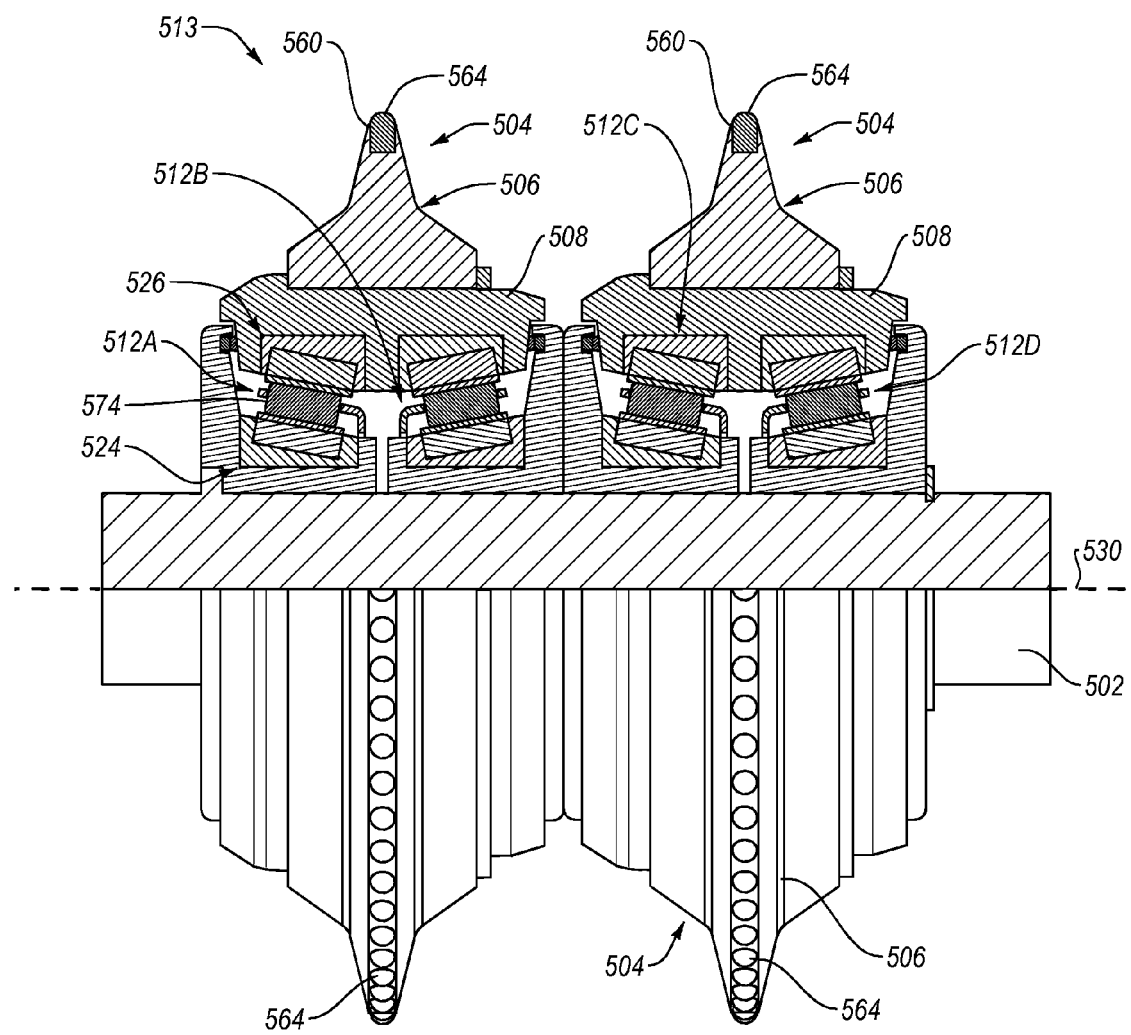
FIG. 10 is a partial, cross-sectional view of a disc cutter according to another embodiment.

While the disc cutter 413 is illustrated a single cutter assembly 404, in other embodiments, the disc cutter 413 may include two, three, or any other suitable number of cutter assemblies 404. For example, as shown in FIG. 10, a disc cutter 513 may include two cutter assemblies 504. The disc cutter 513 may include a shaft 502 that is configured to be fixedly attached to the TBM rotating head 11 (shown in FIG. 1). Each cutter assembly 504 may be attached to a hub 508. As shown, the cutter assemblies 504 may be configured to rotate about the central axis 530 extending through the shaft 502.

Each of the cutter assemblies 504 may be configured as any of the previously described embodiments of the cutter assemblies. For example, the cutter assemblies 504 may each include a cutter ring 506 and plurality of superhard cutting elements 564 (e.g., PCD body) partially disposed in a corresponding pocket (not shown) formed in a crest portion 560 of the cutter ring 506. In an embodiment, both cutter assemblies 504 may be similarly configured. In other embodiments, each cutter assembly 504 may exhibit a different configuration.

In an embodiment, each cutter assembly 504 may be rotatably mounted to the shaft 502 via a pair of tapered roller bearing apparatuses 512A, 512B and 512C, 512D, respectively. In the illustrated embodiment, the tapered roller bearing apparatuses 512A, 512B, 512C, and 512D have the same components and features. Therefore, in the interest of brevity, the components and features of the tapered roller bearing apparatuses 512A, 512B, 512C, and 512D are provided with identical reference numbers, and an explanation thereof will not be repeated. As shown, each of the tapered roller bearing apparatuses 512A, 512B, 512C, and 512D may include an inner race 524, an outer race 526, and a roller assembly 574. Each of the bearing apparatuses 512 may be configured as any of the previously described embodiments of the bearing apparatuses (e.g., bearing apparatus 412A). In an embodiment, both bearing apparatuses 512 may be similarly configured. In other embodiments, each bearing apparatuses 512 may exhibit a different configuration. While each cutter assembly 504 is shown rotatably mounted to the shaft 502 via two tapered roller bearing apparatuses, in other embodiments each cutter assembly 504 may be rotatably mounted to the shaft 502 via one, three, four, or any other suitable number of tapered roller bearing apparatuses.

Figure 11:
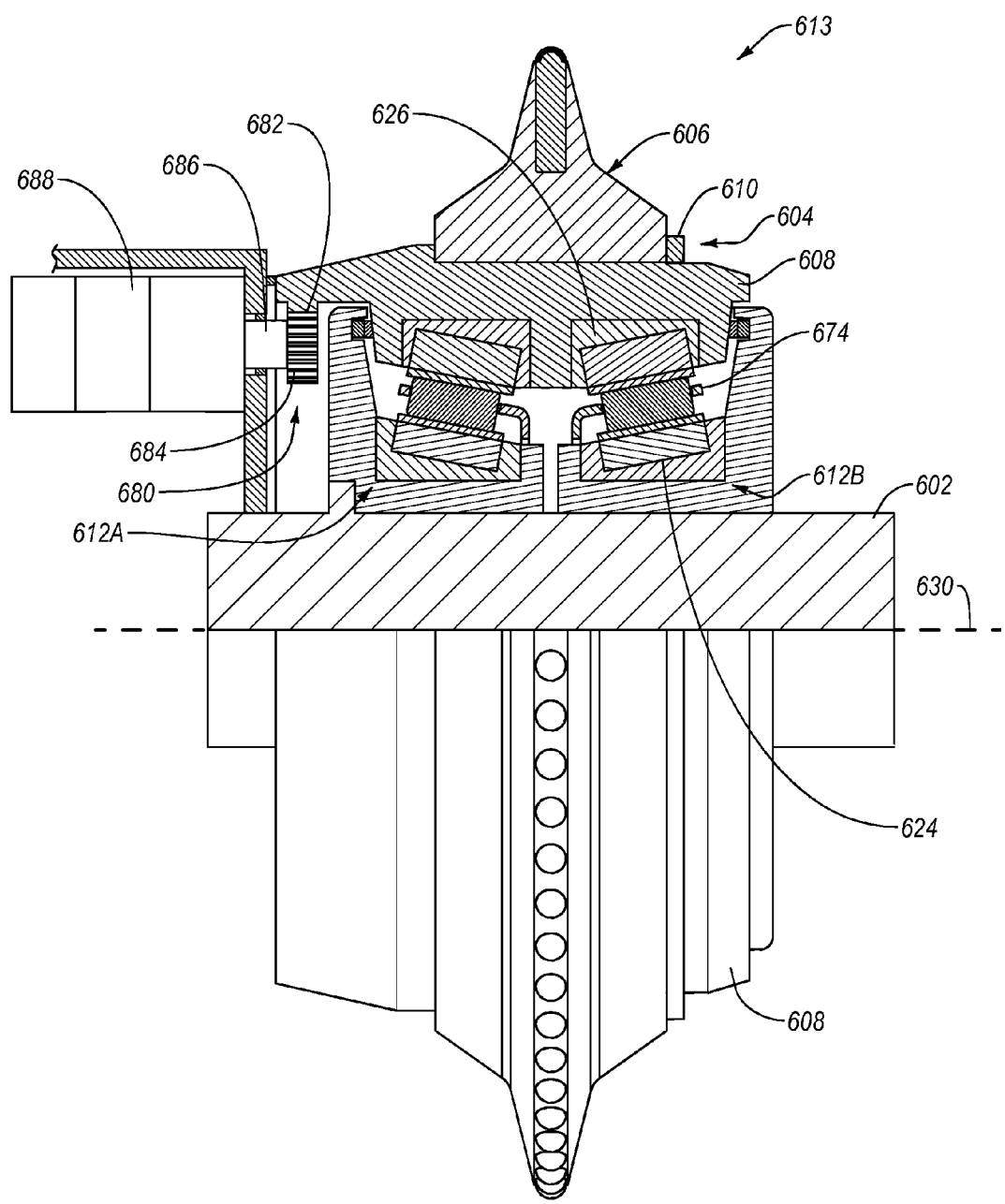
FIG. 11 is a partial, cross-sectional view of a disc cutter according to another embodiment.

Optionally, the disc cutters described herein may include one or more features configured to help rotate the cutter assembly about the central axis extending through the shaft. For example, as shown in FIG. 11, a disc cutter 613 may include a drive system 680 configured to drive the cutter assembly 604 about the shaft 602 as the head 11 rotates about the rotation axis 12 (shown in FIG. 1). The disc cutter 613 may include the shaft 602 that is configured to be fixedly attached to the TBM rotating head 11 (shown in FIG. 1). The cutter assembly 604 may include a cutter ring 606 attached to a hub 608 with a retainer member 610. In an embodiment, the cutter assembly 604 may be rotatably mounted to the shaft 602 via two tapered roller bearing apparatuses 612A, 612B. In the illustrated embodiment, the tapered roller bearing apparatuses 612A, 612B have the same components and features. Therefore, in the interest of brevity, the components and features of the tapered roller bearing apparatuses 612A, 612B are provided with identical reference numbers, and an explanation thereof will not be repeated. For example, each of the tapered roller bearing apparatuses 612A, 612B may include an inner race 624 (i.e., stator) including a plurality of superhard raceway elements, an outer race 626 (i.e., rotor) including a plurality of superhard raceway elements, and a roller assembly 674 interposed between the outer race 626 and the inner race 624. While the cutter assembly 604 is shown rotatably mounted to the shaft 602 via two tapered roller bearing apparatuses, in other embodiments, the cutter assembly 604 is shown rotatably mounted to the shaft 602 via one, four, six, or any other suitable number of tapered roller bearing apparatuses.

As shown, the disc cutter 613 may include a drive system 680 configured to rotate the cutter assembly 604 about the central axis 630. In an embodiment, the drive system 680 may comprise a spur-type gear assembly. For example, at least a portion of an inner surface of the hub 608 may be configured as an internal gear assembly 682 including a plurality of drive teeth that are generally parallel to an actuator drive shaft 686. The disc cutter 613 may further include an external gear assembly 684 including a plurality of drive teeth positioned and configured to selectively engage or mesh with one or more of the drive teeth of the internal gear 682 such that rotation of the external gear assembly 684 may rotate the cutter assembly 604 about the central axis 630. While drive mechanism 680 is illustrated comprising an internal gear assembly and an external gear assembly, in other embodiments, drive system 680 may include external gear assemblies or three, four, or any number of internal and/or external gear assemblies. Further, while drive system 680 is illustrated comprising a spur-type gear assembly, in other embodiments, the drive system 680 may comprise a helical gear assembly, a bevel gear assembly, a worm gear assembly, a rack assembly, combinations thereof, or any other suitable type of drive mechanism.

In an embodiment, an actuator 688 may be connected to the actuator drive shaft 686, which is attached to external gear assembly 684. In other embodiments, the actuator 688 may be connected directly to the external gear assembly 684. Actuator 688 may be configured to control rotation of the external gear assembly 684 to rotate the cutter assembly 604 about the central axis 630. For example, when actuator 688 turns, actuator drive shaft 686 and external gear assembly 684 are turned to rotate the cutter assembly 604. In an embodiment, actuator 688 may comprise an electric multi-turn actuator. Such a configuration may allow drive system 680 to generate significant torque while utilizing minimum space. For example, electric multi-turn actuator 688 may be configured to turn drive system 680 in a first direction and/or a second direction. While an electric multi-turn actuator 688 is described, drive system 680 may be actuated by various different means. For example, actuation may be hydraulic, electric, pneumatic, manual, electric-hydraulic, combinations thereof, or any suitable type of actuation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A disc cutter for use on a tunnel boring machine, comprising:
   a shaft;
   a cutter assembly rotatably mounted on the shaft, the cutter assembly including a cutter ring extending circumferentially about a central axis and including a radially inner surface and a radially outer surface; and one or more conical sliding bearing apparatuses rotatably mounting the cutter assembly to the shaft, the one or more conical sliding bearing apparatuses including:
a rotor extending circumferentially about the central axis, and a first plurality of superhard bearing elements distributed circumferentially about the central axis, each of the first plurality of superhard bearing elements attached to the rotor and including a bearing surface; and
a stator extending circumferentially about the central axis, and a second plurality of superhard bearing elements attached to the stator and generally opposed to the first plurality of superhard bearing elements of the rotor,
wherein the radially outer surface of the cutter ring includes a plurality of pockets formed therein, and a plurality of cutting elements is distributed circumferentially about the central axis, each of the plurality of cutting elements being positioned in a corresponding one of the pockets and comprising a superhard body that includes polycrystalline diamond and an elongated backing portion, at least a number of the cutting elements having a generally domed shape defined by the polycrystalline diamond, each of the plurality of cutting elements having the elongated backing portion positioned in a corresponding one of the pockets and the generally domed shape extending beyond the corresponding one of the pockets of the cutter ring and extending beyond the radially outer surface of the cutter ring.

2. The disc cutter of claim 1, wherein the rotor includes a first support ring having a first plurality of recesses, each of the first plurality of superhard bearing elements being positioned in a corresponding one of the first recesses, and wherein the stator includes a second support ring having a second plurality of recesses, each of the second plurality of superhard bearing elements being positioned in a corresponding one of the second recesses.

3. The disc cutter of claim 1, wherein at least one of the first plurality of superhard bearing elements or the second plurality of superhard bearing elements includes a substrate and a polycrystalline diamond bonded to the substrate.

4. The disc cutter of claim 1, wherein each of the bearing surfaces comprises concavely-curved bearing surfaces or convexly-curved bearing surfaces.

5. The disc cutter of claim 2, wherein at least one of the first plurality of superhard bearing elements are brazed, interference-fitted, or fastened to the first support ring.

6. The disc cutter of claim 1, wherein the first plurality of superhard bearing elements or the second plurality of superhard bearing elements includes gaps between adjacent ones of the superhard bearing elements.

7. The disc cutter of claim 1, wherein at least one of the cutting elements is secured to the cutter ring via one or more resilient members positioned between a side surface of the pocket and the at least one of the superhard cutting elements.

8. The disc cutter of claim 7, wherein the one or more resilient members includes a snap ring, a c-clip, a pin, or a retaining ring.

9. The disc cutter of claim 7, further comprising a second cutter assembly rotatably mounted on the shaft.

10. The disc cutter of claim 1, further comprising a drive mechanism to rotate the cutter assembly about the shaft.

11. The disc cutter of claim 1, wherein the plurality of pockets formed in the outer surface of the cutter ring are arranged in a single row about the central axis.

12. A disc cutter for use on a tunnel boring machine, comprising:
a shaft;
a cutter assembly rotatably mounted on the shaft, the cutter assembly including a cutter ring extending circumferentially about a central axis, the cutter ring including a radially inner surface and a radially outer surface, and a plurality of cutting elements is distributed circumferentially about the central axis;
a hub attached to the cutter ring;
one or more inner members attached to the shaft each of the one or more inner members including a pocket defined by lateral walls and a bottom that is spaced from the shaft; and
one or more roller bearing apparatuses positioned between the hub and the one or more inner members and rotatably mounting the cutter assembly to the shaft, the one or more roller bearing apparatuses including:
a rotor attached to the hub and extending circumferentially about the central axis, and a first plurality of superhard raceway elements distributed circumferentially about the central axis, each of the first plurality of superhard raceway elements attached to the rotor and including a raceway surface positioned and configured to form a first portion of a raceway;
a stator attached to corresponding one of the one or more inner members and positioned inside the pocket in the inner member, the stator extending circumferentially about the central axis, and second plurality of superhard raceway elements distributed circumferentially about the central axis, each of the second plurality of superhard raceway elements attached to the stator and including a raceway surface positioned and configured to form a second portion of the raceway; and
a plurality of rolling elements interposed between the rotor and the stator.

13. The disc cutter of claim 12, wherein at least one of the first plurality of superhard raceway elements or the second plurality of superhard raceway elements includes a substrate and a polycrystalline diamond table bonded to the substrate.

14. The disc cutter of claim 12, wherein the one or more roller bearing apparatuses further includes a cage configured to retain the plurality of generally elongated rolling elements between the stator and the rotor.

15. The disc cutter of claim 12, wherein the one or more roller bearing apparatuses includes a tapered rolling bearing apparatus.

16. The disc cutter of claim 12, further comprising a drive system configured to rotate the cutter assembly about the shaft.

17. A method of manufacturing a disc cutter for use on a tunnel boring machine, the method comprising:
providing a cutter assembly including a cutter ring having a cutting surface and a radially outer surface;
rotatably mounting the cutter assembly on a shaft via one or more conical sliding bearing apparatuses, wherein the one or more conical sliding bearing apparatuses include:
a rotor extending circumferentially about the central axis, and a first plurality of superhard bearing elements distributed circumferentially about the central axis, each of the first plurality of superhard bearing elements attached to the rotor and including a bearing surface; and
a stator extending circumferentially about the central axis, and a second plurality of superhard bearing elements attached to the stator and generally opposed to the first plurality of superhard bearing elements of the rotor, wherein the cutter ring includes an inner surface and an outer surface, the outer surface including a plurality of pockets formed therein, and a plurality of cutting elements is distributed circumferentially about the central axis, each of the plurality of cutting elements being positioned in a corresponding one of the pockets and comprising a superhard body that includes polycrystalline diamond and an elongated backing portion, at least a number of the cutting elements having a generally domed shape defined by the polycrystalline diamond, each of the plurality of cutting elements having the elongated backing portion positioned in a corresponding one of the pockets and the generally domed shape extending beyond the corresponding one of the pockets of the cutter ring and extending beyond the radially outer surface of the cutter ring.

* * * * *